(12) United States Patent
Ichihara

(10) Patent No.: US 7,504,796 B2
(45) Date of Patent: Mar. 17, 2009

(54) INVERTER DEVICE

(75) Inventor: Takao Ichihara, Mie (JP)

(73) Assignee: Fuji Electric FA Components & Systems Co., Ltd., Tokyo (JP)

( * ) Notice: Subject to any disclaimer, the term of this patent is extended or adjusted under 35 U.S.C. 154(b) by 214 days.

(21) Appl. No.: 11/672,159

(22) Filed: Feb. 7, 2007

(65) Prior Publication Data

US 2007/0205742 A1 Sep. 6, 2007

(51) Int. Cl.
*H02P 27/04* (2006.01)

(52) U.S. Cl. .................. 318/801; 318/471; 318/472; 388/934

(58) Field of Classification Search ............. 318/801, 318/811, 471–473; 388/934
See application file for complete search history.

(56) References Cited

U.S. PATENT DOCUMENTS

| | | | | |
|---|---|---|---|---|
| 5,168,415 A | * | 12/1992 | Osuga | 361/28 |
| 5,525,881 A | * | 6/1996 | Desrus | 318/471 |
| 5,744,927 A | * | 4/1998 | Hayashida | 318/599 |
| 5,875,414 A | * | 2/1999 | Tsutsumi | 702/99 |
| 6,294,888 B1 | * | 9/2001 | Becker | 318/471 |
| 7,112,941 B2 | * | 9/2006 | Chrostowski | 318/801 |
| 2003/0076232 A1 | | 4/2003 | Sato et al. | |

FOREIGN PATENT DOCUMENTS

| | | |
|---|---|---|
| EP | 0792008 A2 | 8/1997 |
| EP | 06026831.5-1242 | 10/2007 |
| JP | 07-135731 | 5/1995 |
| JP | 2003-134839 | 5/2003 |
| WO | WO-2004/110837 A2 | 12/2004 |
| WO | WO-2005/043618 A1 | 5/2005 |

* cited by examiner

*Primary Examiner*—Bentsu Ro
*Assistant Examiner*—Thai Dinh
(74) *Attorney, Agent, or Firm*—Rabin & Berdo, PC

(57) ABSTRACT

A running pattern of one cycle in a preset industrial machine is observed by a current detector and a temperature rise value estimating unit that are additionally provided in a traditional inverter device. The temperature rise value estimating unit derives a maximum temperature rise estimate value for each constituent element in the case where the running pattern is periodically repeated, on the basis of observation data of the one cycle and a temperature rise model of each constituent element of the inverter device.

20 Claims, 4 Drawing Sheets

INVERTER DEVICE

BACKGROUND OF THE INVENTION

1. Field of the Invention

This invention relates particularly to an inverter device that drives an AC motor as a mechanical power source for industrial machines of various types in which repetitive operations are carried out in a preset running pattern.

2. Description of the Related Art

FIG. 3 is a circuit diagram showing an exemplary traditional inverter device of this type, that is, so-called V/f-control inverter.

In FIG. 3, 10 represents an inverter main circuit having a configuration shown in FIG. 4, which will be described below, and 20 represents a control circuit that controls the supply of desired AC power to an AC motor 1 from the inverter main circuit 10. The control circuit 20 includes: an acceleration/deceleration adjustor 21 that increases or decreases, with a desired gradient, a frequency designation value from a high-order controller, not shown, for controlling the running operation of the industrial machine, and ultimately converts it to a frequency setting value $f_1{}^*$ coincident with the frequency designation value; a voltage pattern generator 22 that generates a primary voltage setting value $V_1{}^*$ (DC quantity) of the AC motor 1 in accordance with a boost quantity for increasing the voltage in the V/f control and in accordance with the frequency setting value $f_1{}^*$ in order to maintain a constant magnetic flux even when the AC motor 1 is running in a low-speed zone; an integrator 23 that outputs a phase setting value $\Theta^*$ acquired by time integration of the frequency setting value $f_1{}^*$; a voltage designation value generator 24 that generates three phase AC voltage designation values $v_U{}^*, v_V{}^*, v_W{}^*$ based on the phase setting value $\Theta^*$ and the primary voltage setting value $V_1{}^*$; a carrier generator 25 that generates a carrier frequency that is gradually changed, if necessary, on the basis of the frequency setting value $f_1{}^*$; and a PWM circuit 26 that performs a Pulse Width Modulation calculation on each of the AC voltage designation values $v_U{}^*, v_V{}^*, v_W{}^*$, for example, using a triangular wave signal based on the carrier frequency, and generates a driving signal for the inverter main circuit 10 corresponding to the result of the calculation.

FIG. 4 is a circuit diagram showing an exemplary detailed configuration of the inverter main circuit 10 shown in FIG. 3. When an AC power source 2 such as a commercial power source is applied to the inverter main circuit 10 via a contactor 3, the voltage is rectified by a diode rectifying circuit 11 of three-phase bridge connection. This rectified voltage is changed to a substantially smoothed DC voltage by a smoothing capacitor 12. The DC voltage is converted to an AC voltage having a desired amplitude and frequency by an inverter circuit 13 formed by making three-phase bridge connection of an IGBT and an inverse-parallel diode circuit. The IGBT 14 is turned into the ON-state when the voltage between the two ends of the smoothing capacitor 12 has exceeded a predetermined upper limit value because of a regenerative current caused by a braking operation of the AC motor 1. This ON-state causes the regenerative current to flow into a regenerative discharge resistor 15. As a result, the rise in the voltage between the two ends is restrained. For example, see JP-A-7-135731 and JP-A-2003-134839.

In industrial machines of various types in which repetitive operations are carried out in a preset running pattern, using the traditional inverter device shown in FIG. 3 and FIG. 4, a calculated temperature rise value for each constituent element of the inverter main circuit 10 in one cycle of the running pattern is theoretically found, and the electric power capacity of each constituent element is selected so that the calculated value will not exceed a tolerance value.

However, when the industrial machine is actually operated, the temperature rise value of a semiconductor device such as the inverter circuit 13 and the regenerative discharge resistor 15 as the constituent elements of the inverter main circuit 10 in one cycle of the running pattern may differ from the calculated temperature rise value. In the worst case, a protection circuit, not shown, of the inverter device can be overloaded after the running pattern is repeated many times (for example, several hundred times or more) in the industrial machine. This raises a problem that the inverter device will be stopped and the subsequent operation cannot be continued.

Traditionally, in order to solve the above problem, the continuation of the operation of the inverter device is monitored while repeating the running pattern a predetermined number of times. However, this monitoring takes time and labor.

SUMMARY OF THE INVENTION

It is an object of this invention to provide an inverter device that can solve the above problems.

According to a first aspect of the invention, an inverter device that supplies desired AC power to an AC motor as a mechanical power source for industrial machines of various types and thus performs variable-speed control of the motor, includes a temperature rise value estimating unit that observes a running pattern of one cycle in the industrial machine by the inverter device and derives a maximum temperature rise estimate value for each of constituent elements of the inverter device in the case where the running pattern is repeated periodically, on the basis of observation data of the one cycle and a temperature rise model for each of the constituent elements of the inverter device.

According to a second aspect of the invention, in the inverter device according to the first aspect of the invention, the observation data includes an output current and a carrier frequency of the inverter device.

According to a third aspect of the invention, in the inverter device according to the first aspect of the invention, the observation data includes an output current and a carrier frequency of the inverter device, and an ambient temperature of the inverter device.

According to a fourth aspect of the invention, in the inverter device according to one of the first to third aspects of the invention, the constituent element for which the maximum temperature rise estimate value is found is a semiconductor device of an inverter main circuit.

According to a fifth aspect of the invention, in the inverter device according to one of the first to third aspects of the invention, the constituent element for which the maximum temperature rise estimate value is found is a regenerative discharge resistor of an inverter main circuit.

According to the invention, as the temperature rise estimating unit is additionally provided in the traditional inverter device and the running pattern of one cycle is observed, the maximum temperature rise estimate value for each constituent element of the inverter device in the case where the running pattern is periodically repeated can be derived, as will be described later. As selection of the electric power capacity and modification of the running pattern are carried out so that the estimate value will not exceed a tolerance value of the constituent element, unwanted interruptions in operation that would otherwise occur during continuous operation can be prevented.

DETAILED DESCRIPTION OF THE PREFERRED EMBODIMENTS

Figure 1:
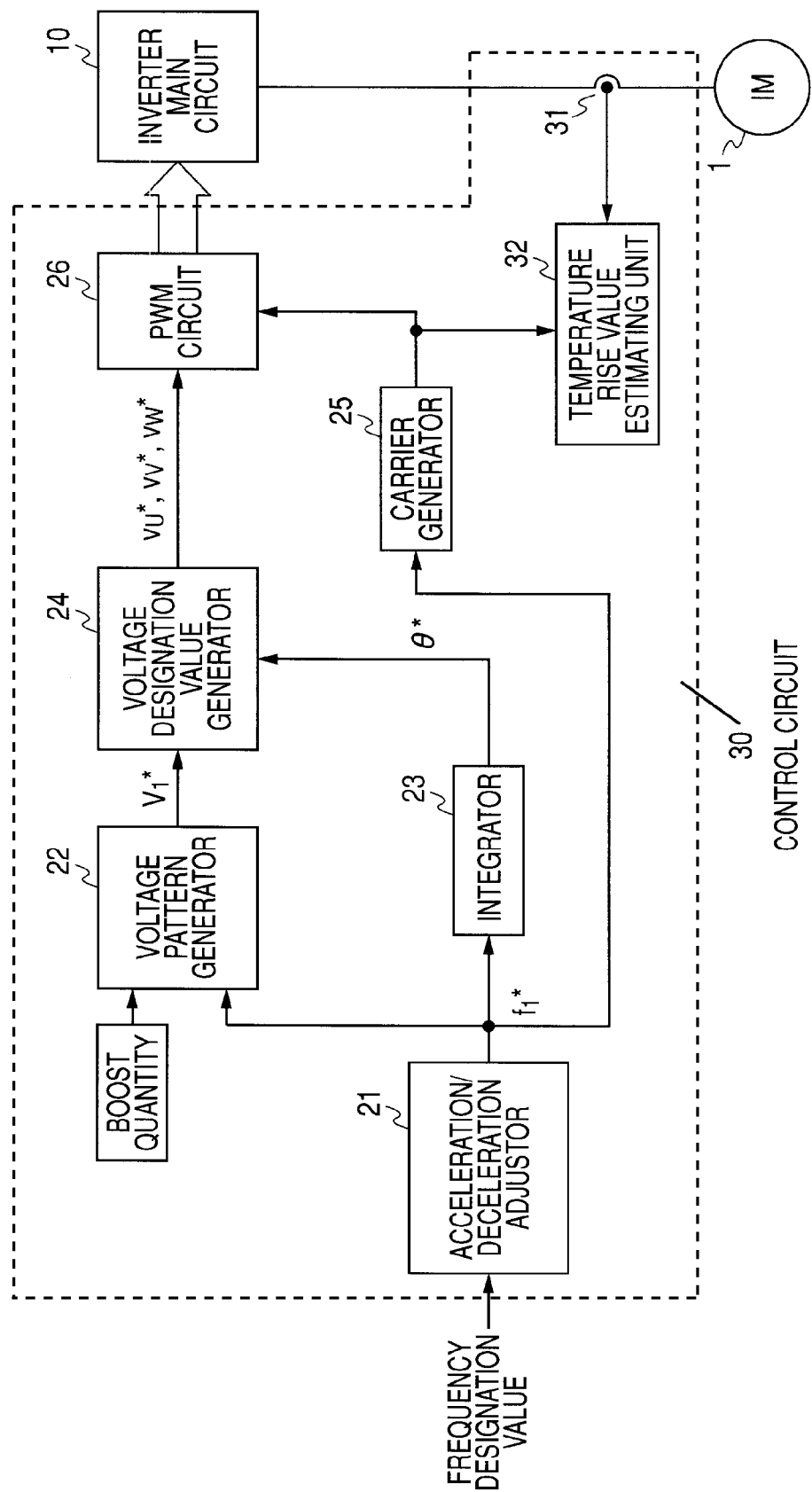
FIG. 1 is a circuit diagram of an inverter device according to an embodiment of the invention.

FIG. 1 is a circuit diagram of an inverter device according to an embodiment of the invention. The elements having the same functions as in the traditional circuit shown in FIG. 3 are denoted by the same reference numerals and will not be described further in detail.

Figure 3:
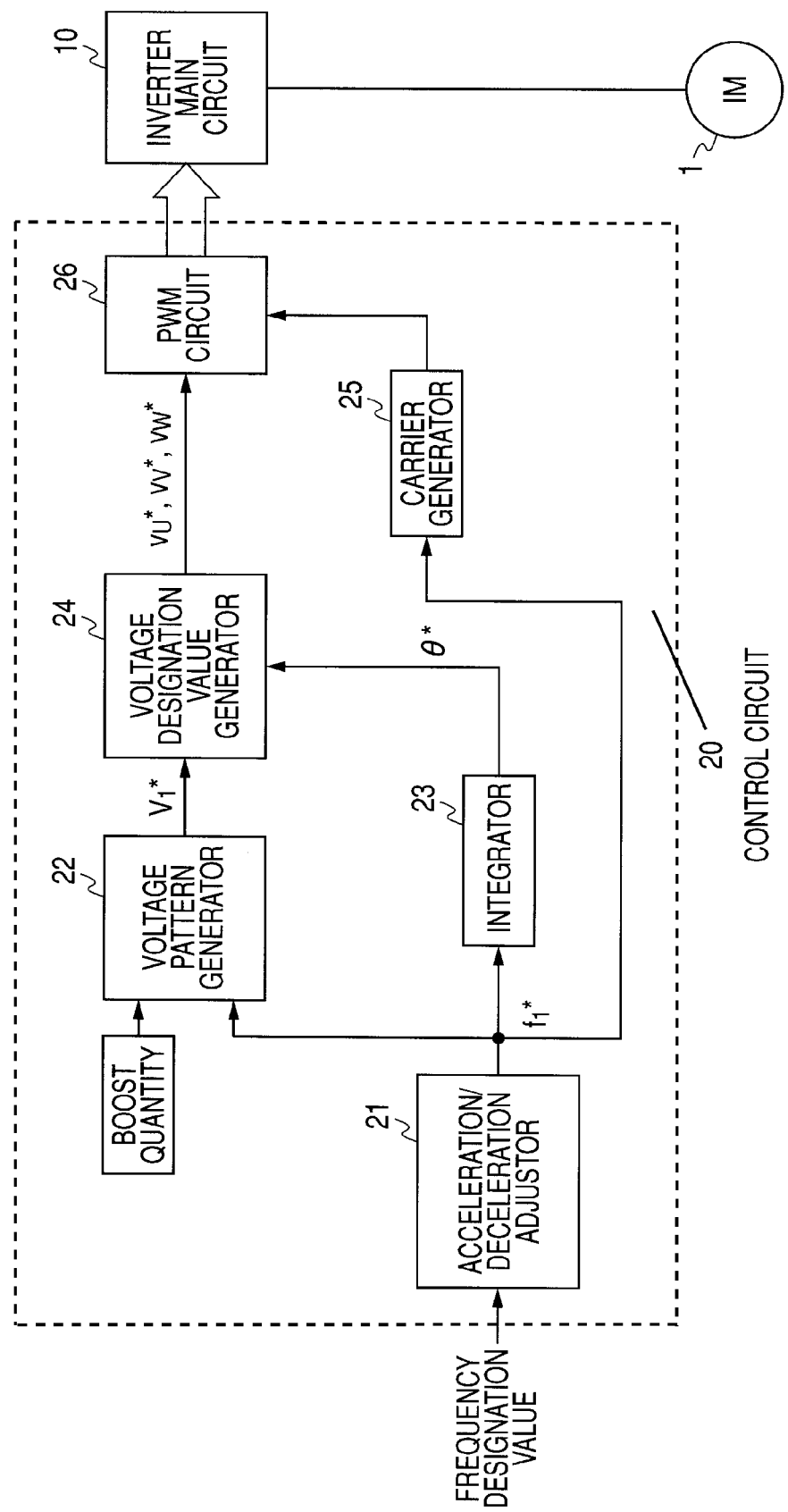
FIG. 3 is a circuit diagram of an inverter device according to a traditional example.

The inverter device shown in FIG. 1 has a control circuit 30 formed by additionally providing a current detector 31 and a temperature rise value estimating unit 32 in the control circuit 20 of FIG. 3.

Figure 2:
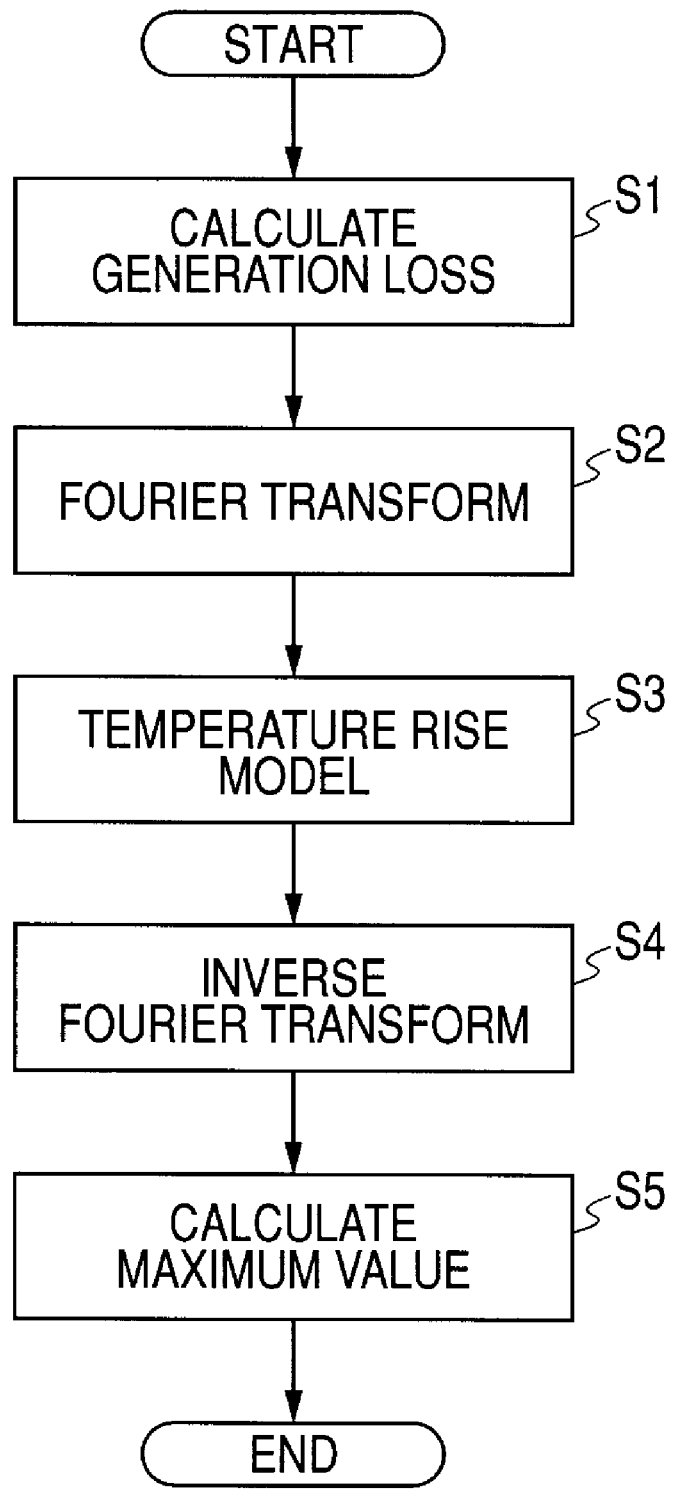
FIG. 2 is a flowchart for explaining the operation of FIG. 1.

The operation of the temperature rise value estimating unit 32 shown in FIG. 1 will be described hereinafter with reference to the flowchart of FIG. 2.

Figure 4:
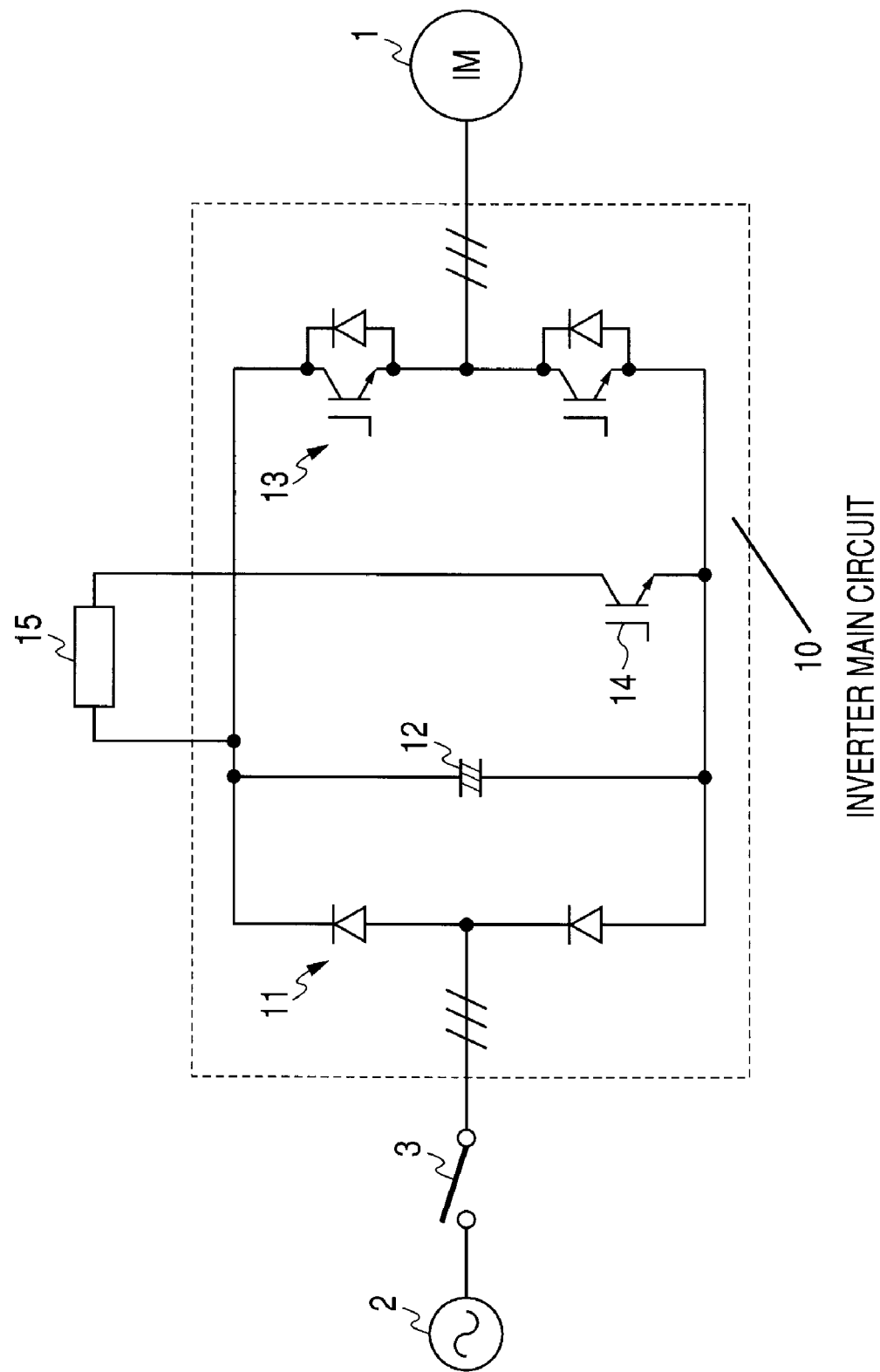
FIG. 4 is a circuit diagram showing a detailed configuration of a part of FIG. 3.

With the temperature rise value estimating unit 32 of the inverter device shown in FIG. 1, which drives the AC motor 1 as a mechanical power source for industrial machines of various types in which repetitive operations are carried out in a preset running pattern, the running pattern of one cycle in the industrial machine is observed by the inverter device, and on the basis of the observation data, a maximum temperature rise estimate value for the inverter circuit 13 (see FIG. 4) constituting the inverter main circuit 10 is derived. This method in which the maximum temperature rise estimate value is derived will be described hereinafter with regard to FIG. 2.

First, in step S1, a generation loss of the inverter circuit 13 is periodically calculated, with a preset period, from a respective detection value (sample value) of the current detector 31 and the respective value of the carrier frequency from the carrier generator 25, as the observation data. Before deriving this generation loss, it must be acquired in advance by experiment or the like because the generation loss is substantially proportional to the output current value from the inverter main circuit 10 for each of the carrier frequency values.

In step S2, the generation loss values in the time domain calculated in step S1 are Fourier-transformed to data in the frequency domain.

In step S3, temperature rise data is calculated on the basis of the data in the frequency domain acquired in step S2 and a temperature rise model of a circuit that includes a semiconductor device of the inverter circuit 13 and a cooler of the inverter circuit 13 and that can be regarded as equivalent to a first-order lag circuit.

Next, in step S4, the temperature rise data is inversely Fourier-transformed to temperature rise values in the time domain.

Moreover, in step S5, a maximum temperature rise estimate value (in the case where the running pattern is periodically repeated) is derived on the basis of the calculated temperature rise value in the time domain and the ambient temperature of the inverter device.

By using, in a preferred embodiment, a scale transform method for inverse Fourier transformation when carrying out the calculations of steps S4 and S5, it is easy to derive the maximum temperature rise value in a short time. Moreover, the temperature of the cooler of the inverter circuit 13 may be used instead of the ambient temperature of the inverter device.

Next, with the temperature rise value estimating unit 32 of the inverter device shown in FIG. 1, which drives the AC motor 1 as a mechanical power source for industrial machines of various types in which repetitive operations are carried out in a preset running pattern, the running pattern of one cycle in the industrial machine is observed by the inverter device, and on the basis of the observation data, a maximum temperature rise estimate value for the regenerative discharge resistor 15 (see FIG. 4) constituting the inverter main circuit 10 is derived. This deriving method will be described hereinafter.

First, in step S1, a generation loss of the regenerative discharge resistor 15 in the case where the IGBT 14 is in the ON-state is calculated from a detection value (sample value) of the current detector 31 for each preset period and the ON/OFF-state of the IGBT 14 (see FIG. 4) as the observation data. Before deriving this generation loss, it must be acquired in advance by experiment or the like because the generation loss is substantially proportional to the ON-period of the IGBT 14 and the current value to the inverter main circuit 10 at this point.

In step S2, the generation loss values in the time domain calculated in step S1 are Fourier-transformed to data in the frequency domain.

In step S3, temperature rise data is calculated on the basis of the data in the frequency domain acquired in step S2 and a temperature rise model of the regenerative discharge resistor 15 that is regarded as equivalent to a first-order lag circuit.

Next, in step S4, the temperature rise data is inversely Fourier-transformed to temperature rise values in the time domain.

Moreover, in step S5, a maximum temperature rise estimate value for the regenerative discharge resistor 15 in the case where the running pattern is periodically repeated is derived on the basis of the calculated temperature rise value in the time domain and the ambient temperature of the inverter device.

When the temperature rise value of the regenerative discharge resistor 15 can be regarded as being substantially proportional to the ON-period of the IGBT 14, the observation of the detection value of the current detector 31 at this point, that is, the current value to the inverter main circuit 10, can be omitted.

It will be appreciated by those skilled in the art that the invention may be practiced otherwise than as specifically described in the preferred embodiments without departing from the scope thereof.

What is claimed is:

1. An inverter device that supplies desired AC power to an AC motor employed as a mechanical power source for an industrial machine, the inverter device comprising:
   a constituent element; and
   a temperature rise value estimating unit including:
      means for observing the inverter device for one cycle of a periodically repeated running pattern of the industrial machine when powered by the inverter device; and
      means for deriving a maximum temperature rise estimate value for the constituent element on the basis of observation data for said one cycle and on the basis of a temperature rise model for the constituent element.

2. The inverter device according to claim 1, wherein the observation data includes an output current and a carrier frequency of the inverter device.

3. The inverter device according to claim 2, wherein the observation data includes an ambient temperature of the inverter device.

4. The inverter device according to claim 1, wherein the observation data includes an ambient temperature of the inverter device.

5. The inverter device according to claim 1, wherein the constituent element is a semiconductor device.

6. The inverter device according to claim 5, comprising an inverter main circuit including said semiconductor device.

7. The inverter device according to claim 1, wherein the constituent element is a regenerative discharge resistor.

8. The inverter device according to claim 7, comprising an inverter main circuit including said regenerative discharge resistor.

9. The inverter device according to claim 1, wherein the inverter device comprises a plurality of said constituent elements, and the temperature rise value estimating unit comprises means for deriving a respective maximum temperature rise estimate value for each of said plurality of said constituent elements on the basis of observation data and on the basis of a respective temperature rise model for each of said plurality of constituent elements.

10. The inverter device according to claim 1, wherein the inverter device is configured to perform variable-speed control of the AC motor.

11. A method of estimating a maximum temperature rise value for a constituent element of an inverter device that supplies desired AC power to an AC motor employed as a mechanical power source for an industrial machine, the method comprising:

generating observation data of the inverter device for one cycle of a periodically repeated running pattern of the industrial machine when powered by the inverter device; and deriving the maximum temperature rise estimate value for the constituent element on the basis of the observation data for said one cycle and on the basis of a temperature rise model for the constituent element.

12. The method according to claim 11, wherein the observation data includes an output current and a carrier frequency of the inverter device.

13. The method according to claim 12, wherein the observation data includes an ambient temperature of the inverter device.

14. The method according to claim 11, wherein the observation data includes an ambient temperature of the inverter device.

15. The method according to claim 11, wherein the constituent element is a semiconductor device.

16. The method according to claim 15, comprising providing an inverter main circuit including said semiconductor device.

17. The method according to claim 11, wherein the constituent element is a regenerative discharge resistor.

18. The method according to claim 17, comprising providing an inverter main circuit including said regenerative discharge resistor.

19. The method according to claim 11, wherein said step of deriving a maximum temperature rise estimate value comprises deriving a respective maximum temperature rise estimate value for each of a plurality of said constituent elements on the basis of the observation data and on the basis of a respective temperature rise model for each of said plurality of constituent elements.

20. The method according to claim 11, further comprising performing variable-speed control of the AC motor.

\* \* \* \* \*